Figure 1:
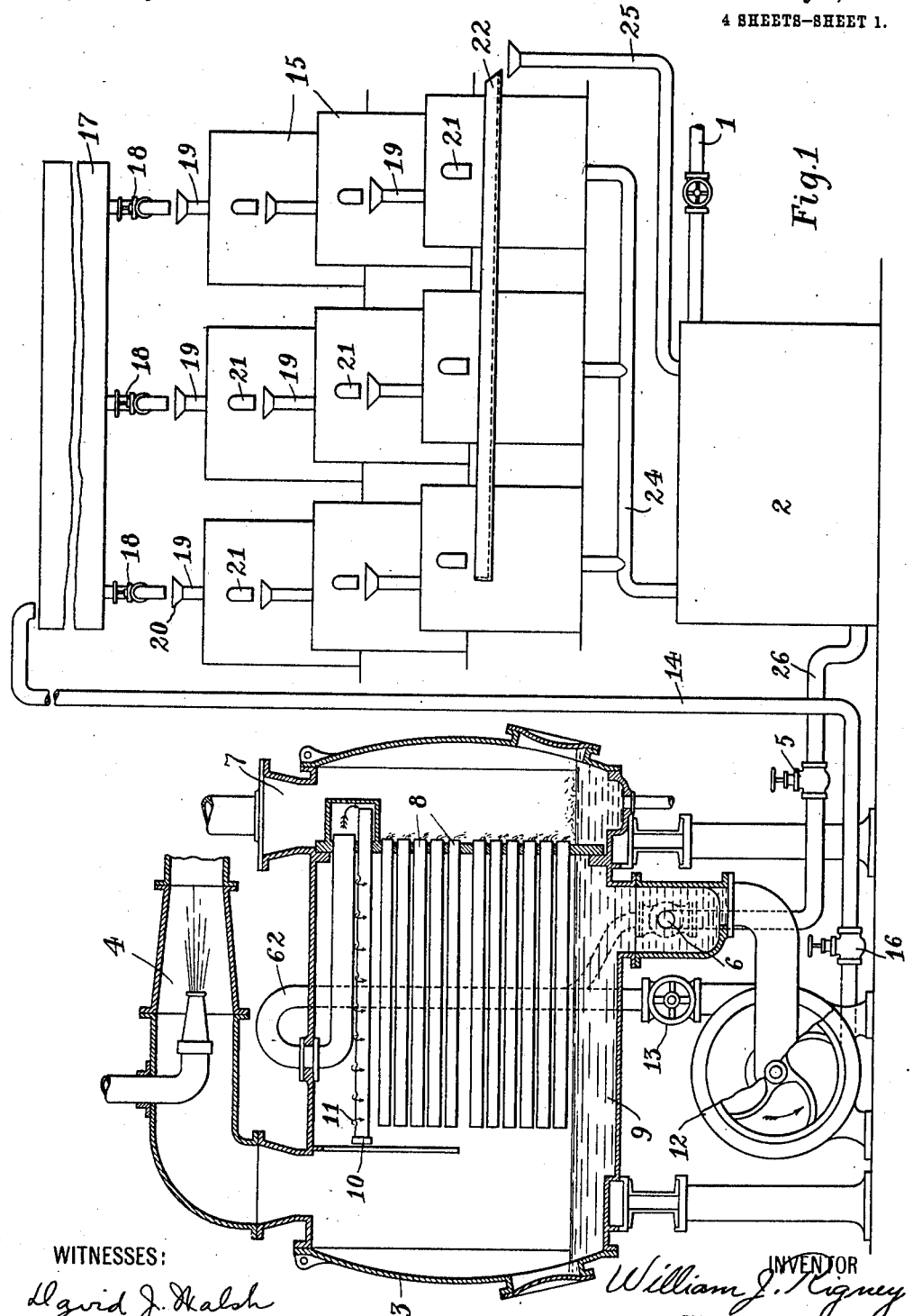

W. J. RIGNEY.
PROCESS AND APPARATUS FOR THE MANUFACTURE OF ROCK CANDY.
APPLICATION FILED OCT. 28, 1911.

W. J. RIGNEY.
PROCESS AND APPARATUS FOR THE MANUFACTURE OF ROCK CANDY.
APPLICATION FILED OCT. 28, 1911.

1,031,199.

Patented July 2, 1912.
4 SHEETS—SHEET 3.

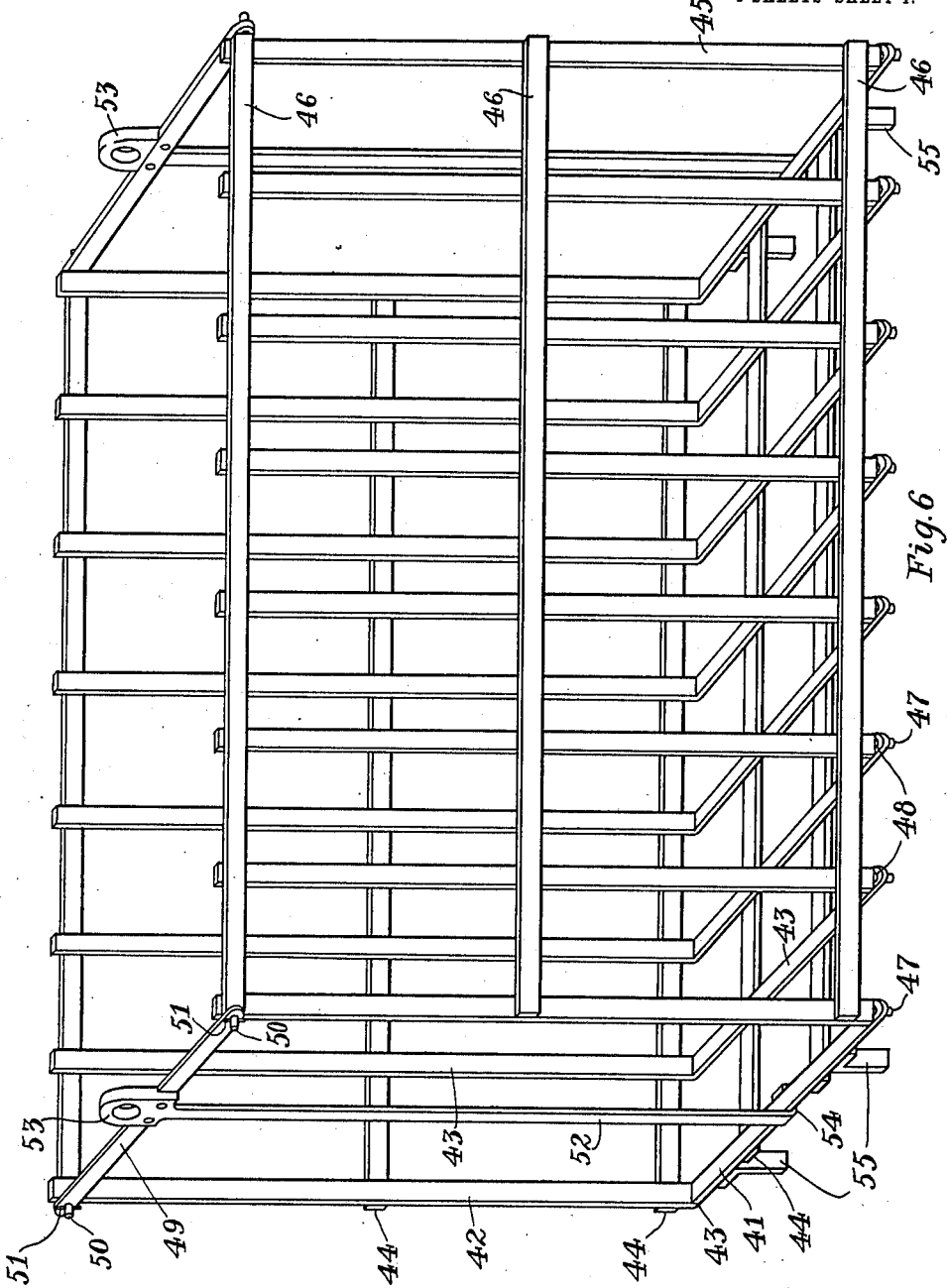

UNITED STATES PATENT OFFICE.

WILLIAM J. RIGNEY, OF BROOKLYN, NEW YORK.

PROCESS AND APPARATUS FOR THE MANUFACTURE OF ROCK-CANDY.

1,031,199. Specification of Letters Patent. Patented July 2, 1912.

Application filed October 28, 1911. Serial No. 657,252.

*To all whom it may concern:*

Be it known that I, WILLIAM J. RIGNEY, a citizen of the United States, and a resident of 12 St. Francis Place, Brooklyn, New York, have invented a new and useful Improvement in Processes and Apparatus for the Manufacture of Rock-Candy, of which the following is a specification.

My invention relates to processes and apparatus for the production of rock candy.

It has for its object to greatly lessen the cost of production of rock candy.

It has also for its object the production of a process of manufacture of rock candy which is automatically controlled and permits the employment of unskilled labor.

It also has for its object the production of apparatus whereby the processes containing the invention may be carried out.

It also has for its object the manufacture of rock candy from low temperature syrup and at a low degree of saturation.

It also has for its object the production of a process wherein rock candy of uniform size will be produced, and a process wherein the size of the candy will not only be uniform but may be varied and controlled as may be desired.

In the processes now known in the art the syrup is superheated to a high temperature to produce a supersaturation of the sugar solution and the solution thus formed crusts over the top of the syrup and over the walls and bottom of the container and as the body of the syrup cools very slowly and while it remains very quietly the candy is gradually formed on the strings, the crystallization on the strings at the bottom of the container being very much greater than on the strings at the top forming larger sticks at the bottom of the container. Some of the sticks of candy formed on the strings at the top are frequently so small that they are quite useless for market purposes. A great deal of sugar is lost by the processes. The crust forming over the top of the syrup and over the surfaces of the container has to be scraped and knocked off and collected and reboiled. The liquor must remain perfectly quiet or the whole mass will turn at once into an amorphous condition forming a solid mass of sugar inclosing the strings, the whole solidly embedded in the container from which it cannot be removed without great difficulty. A slight jar of the container or a jar of the building in which the container is located will do this. By my process practically no crust is formed. The liquid is being constantly moved and is not subject to the effects of jarring and the candy is moreover more rapidly formed and the size of the candy is uniform and may be controlled and requires little heat, it being raised to a point very much below boiling point. The process also has many other advantages as will appear hereinafter.

The invention may be contained in many processes and embodied in many constructions, what I have shown in the drawings and described hereinafter being merely one of the many processes and constructions which contain the invention. It is described and illustrated to show that such processes and apparatus are practical and useful.

Figure 2:
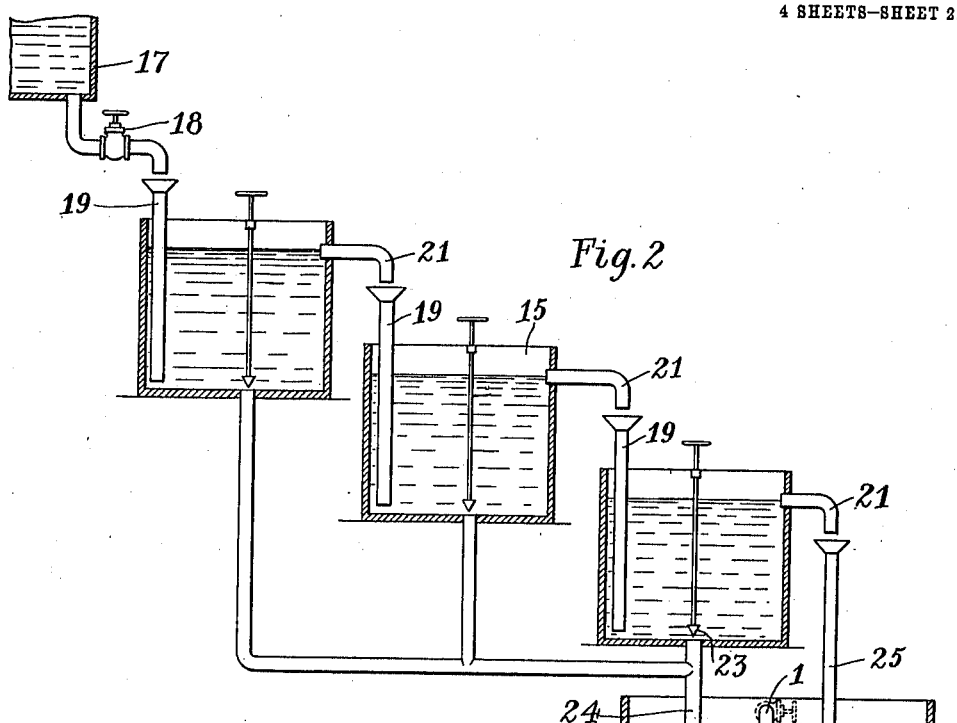
Figure 3:
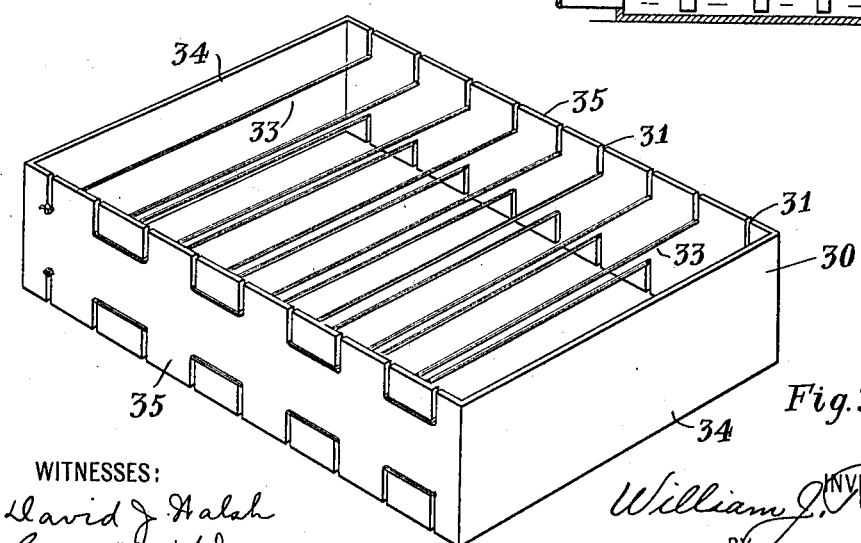
Figure 4:
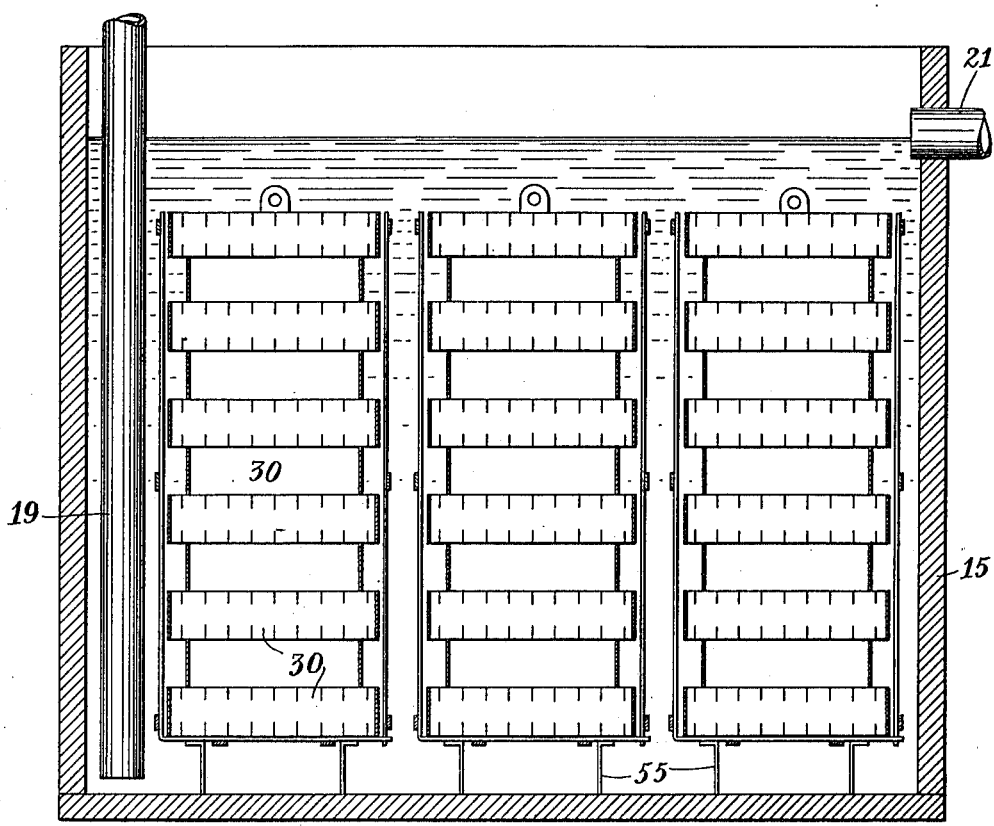
Figure 5:
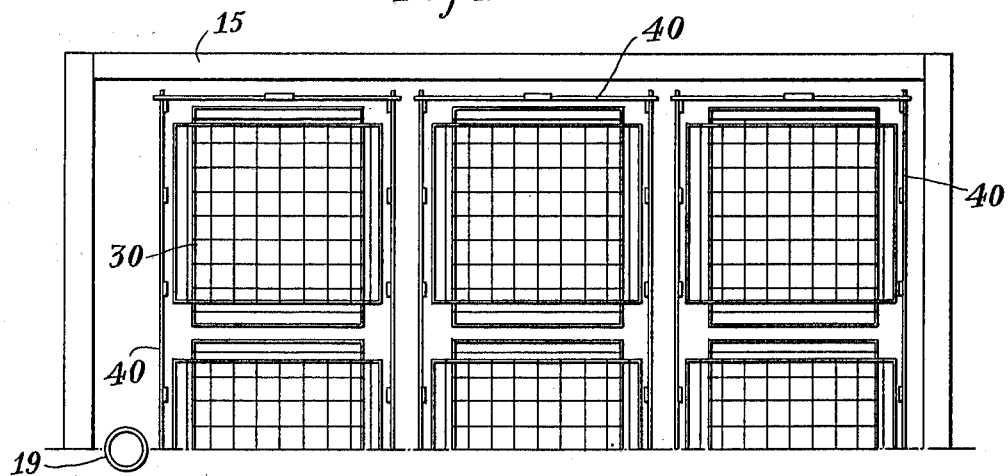

Referring to the figures, Figure 1 illustrates the evaporator and the system of tanks used in the manufacture of rock candy. Fig. 2 is a side sectional view showing the relation between the vats in which the crystals are formed. Fig. 3 illustrates the metallic frame for supporting the strings on which the candy is formed. Fig. 4 is a sectional view showing the arrangement of the frames. Fig. 5 is a top view of the arrangement shown in Fig. 4. Fig. 6 illustrates a rack which is used for supporting the frames.

The syrup is first mixed in any suitable receptacle and may be directed to the system by any suitable pipe or trough or launder such as the pipe 1 shown in Fig. 1. It may be directed to a container 2 or it may be directed to one of the active factors of the system such as the evaporator 3. Any form of an evaporator may be used provided suitable vacuum is formed above the surface of the liquid contained in the evaporator and provided a suitable heating means is provided. In the illustration I have shown an evaporator of one type. The vacuum of the evaporator is produced by the water ejector 4, which draws the liquid from the container 2, through the regulating valve 5 into the evaporator by way of pipe 62 and through the port 6. The heating of the liquid is accomplished by means of steam which enters the chamber 7 and passes into the pipes 8 which are open at the one end. They deliver the water of condensation into the steam chamber 7. The liquid 9 located at the bottom of the evaporator is directed to the top of the evaporator and allowed to pass through a plurality of pipes 10 having openings 11 whence the liquor falls over the pipes 8. The liquor is circulated by means of pump 12. It passes through the regulating valve 13. A by path 14 branches from the circulating system to the crystallizing vats 15. The branching pipe 14 has a regulating valve 16. It conducts the fluid to the reservoir 17 which may be filled with the liquid from the evaporator, when it has been suitably heated and when a portion of the solvent has been removed and the liquor reduced to proper degree of saturation. The fluid then passes through the circulating valves 18 into a plurality of containers. The liquid may first pass through the trough and then into the containers. The regulating valves 13 and 16 regulate the heat of the liquor and also the degree of saturation. If the receptacle 17 is filled the flow of the liquor through the valves 18 will increase, owing to the increase of pressure. This will also raise the level of the liquor in the containers 15 above the ports for the liquor and will consequently increase the flow through the containers. The containers 15 are provided with stand pipes 19 which extend to the bottom of the containers and are also provided with funnel tops 20 for receiving the liquor from the receptacle 17 which may be made in the form of a trough of any desired depth. Each container is provided with the port 21 which is adapted to feed the liquor into the stand pipes of the container located below it in the course of circulation, the liquor finally passes into the trough 22 and back to the container 2. The liquor may be drawn off through the valves 23 and pipe 24. Each of the containers may be connected to the pipe 24 in the same way, in order that all of the liquor may be drawn through the system. The liquor is then drawn through the pipe 26 and valve 5 into the evaporator thereby accomplishing the complete circuit of the system. In each container is located the means for causing the crystallization of the sugar. Each container is provided with a bank of stringed frames. A frame is shown in detail in Fig. 3. The frame 30 is made of flat material preferably of metal. It is provided with slots 31 which extend from opposite edges of about one quarter the width of the frame. The end of the thread is knotted and placed in the first slot or it may be secured by tying, or properly overlapping the end by winding the thread as may be desired. The thread is passed across the frame into the slot in the opposite side and then to the next slot on that side edge and back to the first side and to the next slot on the same edge and so on back and forth and then to the bottom of the frame until all the slots are used and the frame is strung. This provides the means whereby the stringing of the containers may be readily completed. The frames are made of thin material and are laid crosswise to each other in succession as shown in Fig. 4. This prevents the frames from being locked together by the crust of sugar which is apt to be deposited upon the articles contained in the containers. The frames are supported in racks. A rack is shown in detail in Fig. 6. It is made of metal flats which are suitably tied together. The bottom 41 and one of the walls 42 are formed with angle irons 43 which are tied together by means of the ties 44. The wall 45 is removable and its parts are tied together by the ties 46. The ends of the rods forming the side 45 is provided with pins 47 adapted to enter the eyes 48 formed in the angle irons 43. The ends consist of the tie 49 which is provided with holes through which the pins 50 pass. It is secured by cross pins 51. The tie is connected to the bottom by means of the hook rod 52. The ends are provided with eyes 53. A crane or other suitable device may be connected to the eyes 53 and the rack lifted from the container. The hook 54 engages the bottom and the pins engage the sides. The racks are also provided with legs 55 for supporting the rack free from the bottom of the container, to bring the strings away above the bottom and above the end of the stand pipe 19. The racks are inserted side by side in the containers as shown in Figs. 4 and 5. The stand pipe 19 extends to a point below the lowest stringed frame. The liquor entering the stand pipe 19 is heavy with its dissolved sugar and enters quietly the bottom of the container and spreads over the bottom and below the lowest frame. The liquor rises to the port 21 and as it rises, it passes over the strings, the sugar being removed from the liquor and crystallizing on the strings as it moves along so that the rate of deposit is uniform. The size of the candy will thus be uniform throughout the system. If it is desired to manufacture small candy the frames may be removed at an early stage of the process and if it is desired to make larger candy it is allowed to remain in the flowing liquor for a long period of time.

The syrup may be mixed in a suitable agitator or mixing receptacle and then directed to the receiver 2 through the pipe 1. It may then be run through the evaporator to be heated and some of the solvent, that is, the water, may be removed to bring the solution to uniform degree of density but preferably not to the condition of supersaturation. The degree of density will depend upon the coefficient of purity of the sugar. The sugar syrup is merely warmed to about 160° or 180° and while still warm it is directed to the crystallizing tanks. The syrup is run very slowly through the tanks or if desired it may be run through at intervals. The sugar crystallizes when it strikes the threads or the crystals on the threads. It will gradually and uniformly build up the crystals as it passes along, the crystals or threads of the last container of each series removing all of the sugar above a very low degree of saturation. The heavy liquor is passed to the bottom of each container and the liquor rises progressively from the bottom as it becomes less dense by removal of the sugar. It likewise proceeds progressively through the containers. The valves of the system control the rate of flow and this rate of flow is balanced by the reservoir 17. If the depth of the liquor in the reservoir is increased, the rate of flow into the containers and consequently through the containers is increased by reason of the increased pressure produced at the exits of the reservoir. The crystals throughout the system build uniformly by reason of the uniform difference of the heat of each crystal and that of the surrounding liquor, and, also, because of the removal of liquor as it becomes less dense by reason of its crystallization and renewal of fresh liquor of uniform density about each crystal. In case of intermittent flow of the liquor substantially the same occurs except that uniformity exists inversely as there is non-intermittence. When the crystals become the desired size they may be removed by lifting the racks carrying the frames from the crystallizing tanks. Racks with newly threaded frames are again inserted in the liquor in the place of those removed while the process is going on.

The constructions and the processes described may be greatly varied by those skilled in the arts and yet such processes and constructions will still contain my invention.

What I claim as new and desire to secure by Letters Patent is the following:—

1. The process of manufacture of rock candy consisting in directing a syrup circuitously through one or more containers having threads and evaporating a portion of the solvent of the sugar forming the syrup.

2. The process of manufacture of rock candy consisting in directing a syrup circuitously through one or more containers having threads and evaporating a portion of the solvent of the syrup by suction and while being heated.

3. The process of manufacture of rock candy consisting in directing a syrup circuitously through one or more containers having threads and evaporating a portion of the solvent of the sugar forming the syrup at the temperature at about 180° Fahrenheit.

4. The process of manufacture of rock candy consisting in evaporating a portion of the solvent of a syrup by suction, while below boiling point and above 150° Fahrenheit and continuously directing the resultant syrup to the bottom of one or more containers having threads and continuously collecting the syrup produced from the top of each container.

5. In an apparatus for manufacture of rock candy, the combination of an evaporator, means for heating the contents of the said evaporator, a container having threads strung cross-wise the said container and means for causing the syrup to flow through the said evaporator and the said container, and means for directing liquor to the bottom of the said container.

6. In an apparatus for manufacture of rock candy, the combination of an evaporator, means for heating the contents of the said evaporator, a plurality of containers containing threads adapted to receive the liquid from the said evaporator, means for collecting the liquid from the top of each container and for directing the liquid to the bottom of each container, means for causing a flow of the liquid through the said evaporator and the said container.

7. In an apparatus for manufacture of rock candy, the combination of an evaporator, a crystallizing tank containing suspended threads and a circulating pump for causing continuous movement of the syrup through the evaporator and the crystallizing tank.

8. The process of manufacturing rock candy, consisting of the gradual development of the crystals by the continuous evaporation of the syrup and the circuitous flow of the liquor over crystallizing strings.

In testimony whereof, I have signed my name to this specification in the presence of two subscribing witnesses.

WILLIAM J. RIGNEY.

Witnesses:
F. F. CRAMPTON,
MILTON G. BUCKY.

Copies of this patent may be obtained for five cents each, by addressing the "Commissioner of Patents, Washington, D. C."